(12) United States Patent
Wen-Pin et al.

(10) Patent No.: US 7,435,346 B2
(45) Date of Patent: Oct. 14, 2008

(54) STRENGTHENING CONSTRUCTION FOR DEPRESSING CAP OF WATER FILTER

(75) Inventors: Hsieh Wen-Pin, Keelung (TW); Huang Chung-Yen, Keelung (TW); Lin Chih-Kai, Sinjhuang (TW); Hu Chien-Hsin, Taipei (TW); Wang Mei-Hsin, Sindian (TW)

(73) Assignee: Hantech Co., Ltd., Taipei (TW)

( * ) Notice: Subject to any disclaimer, the term of this patent is extended or adjusted under 35 U.S.C. 154(b) by 0 days.

(21) Appl. No.: 11/672,175

(22) Filed: Feb. 7, 2007

(65) Prior Publication Data
US 2008/0185329 A1 Aug. 7, 2008

(51) Int. Cl.
*B01D 27/08* (2006.01)
*B01D 35/30* (2006.01)

(52) U.S. Cl. .......................... 210/232; 210/444
(58) Field of Classification Search ................. 210/232, 210/444
See application file for complete search history.

(56) References Cited

U.S. PATENT DOCUMENTS 4,617,117 A * 10/1986 Messinger et al. ....... 210/198.1
4,721,563 A * 1/1988 Rosaen ....................... 210/85
4,812,230 A * 3/1989 Gerulis ...................... 210/108
5,484,529 A * 1/1996 Malugade et al. .......... 210/448
5,498,333 A * 3/1996 Canther ................... 210/198.1

FOREIGN PATENT DOCUMENTS

DE          4023515        *  1/1992

* cited by examiner

*Primary Examiner*—Thomas M Lithgow
(74) *Attorney, Agent, or Firm*—Lowe Hauptman Ham & Berner, LLP

(57) ABSTRACT

Disclosed is a strengthening construction for depressing cap of water filter, said depressing cap has a water inlet and a water exit, a pipe line which does not form a via hole for connecting said water inlet and water exit is formed between said water inlet and water exit, and a water falling hole is formed at said pipe line near said water inlet, in addition, a water outlet is formed at the central portion of said pipe line, on the inner wall of the depressing cap, a plurality of gripping elements for firmly holding filter core are separately formed and circularly arrayed, characterized in that: at the base portions of said gripping elements, at least a ring-shaped protecting wall in formed to connect the base portions of said gripping elements. Such that when the water filter is impacted by external force, the impact force on the gripping elements shall be dissipated.

3 Claims, 7 Drawing Sheets

STRENGTHENING CONSTRUCTION FOR DEPRESSING CAP OF WATER FILTER

BACKGROUND OF THE INVENTION

1. Field of the Invention

The present invention relates to a strengthening construction for depressing cap of water filter, especially inside the depressing cap of water filter, at least a ring shaped protecting wall connecting the base portions of gripping elements for holding filter core is formed, so as to prevent the base portions of gripping elements from broken due to external force impacts against water filter.

2. Description of the Related Art

It is known to public that in order to reduce the water pollution to people, water filter is now very important to people's living.

Water filter is used for filtering the impurities in water so as to enable people to drink clean water and keep their bodies getting rids off diseases caused by drinking polluted water.

The elements effective in filtering water are not only reside on the material, the density, and the holes of filter core, but also reside on the water flow path, or the seal function of filter housing. In addition, the water filter must have the design for enduring water pressure.

As shown in FIG. 1, the water filter to be used in industrial factories or other places with large spaces has the same construction of general water filter. It includes a water container 11 and a depressing cap 12. While in order to fixedly hold filter core 13 with longer length, the internal wall of the depressing cap 12 is installed with a plurality of circularly arrayed stripped gripping elements 14 for fixedly holding the filter core (as shown in FIG. 2 and FIG. 3).

The most popularly used water filter has eight stripped gripping elements, at the gripping end of each stripped gripping element, an inwardly declined surface 15 is formed. When the filter core 13 is installed inside the water container 11, and the depressing cap 12 is gradually screwed tightly to joint with water container 11, by using the declined surface 15, the filter core 13 shall fluently slides into the space surrounded by the stripped gripping elements 14 to push the gripping elements outward, and then the filter core 13 is grasped tightly at its surface by the restoring forces of gripping elements 14.

However, the above described construction of depressing cap has the disadvantages of easily to be broken due to the causes stated as follows:

As shown in FIG. 1, FIG. 2, FIG. 3 and FIG. 4, the plurality of circularly arrayed stripped gripping elements 14 are independently formed, and the gripping elements 14 must be formed long enough so as to effectively grip firmly upon the filtering core. For example, as a depressing cap having 18.5 cm long of diameter and 4 cm high of rim, then the height of the gripping element 14 must be about 3.5 cm, while the width of the gripping element is about 1 cm.

Please refer to FIG. 4 again, after combination of depressing cap 12 and the water container 11, the upper edge 111 of the water container 11 shall be inserted into the space between the inner screw 121 of depressing cap 12 and the base portion 141 of the gripping elements 14. When the water filter is in transportation, or maintenance, or repairing, or changing the filtering core, and the water filter is fallen down to the ground due to unconsciousness of worker, then the partial portion of water filter shall be distorted and a compact shearing force shall be generated at the base portion 141 of gripping elements as a result, the gripping element 14 shall be broken at the instant when the water filter is fallen down onto the ground, and, the water filter cannot be used any more. This certainly will cause damages and losses to people.

SUMMARY OF THE INVENTION

Accordingly, the present invention is directed to a construction for improving reliability of a water filter that substantially obviates one or more problems due to the limitations and disadvantageous of the related art.

It is then an object of present invention to provide a strengthening construction for depressing cap of water filter, in which the elements for gripping filtering core formed inside the depressing cap have the strengthening construction, such that when the water filter is fallen down to the ground, the elements for holding filtering core would not be broken, so as to keep the function of water filter.

In order to achieve the object of present invention, there is provided with a strengthening construction for depressing cap of water filter, in which at least a plurality of ring shaped protector connecting the base portions of gripping elements for holding filter core is formed, and said protector has a proper height to form a ring-shaped stop wall. Such that when a portion housing of water filter is distorted by external pressure, the pressure shall be dissipated, and then the external pressure concentrated at a destined portion of housing of water filter to cause the broken of gripping elements for holding filter would be prevented or reduced.

A more complete understanding of these and other features and advantages of the prevent invention will become apparent from a careful consideration of the following detailed description of certain embodiments illustrated in the accompanying drawings.

DETAILED DESCRIPTION OF PREFERRED EMBODIMENTS

Figure 1:
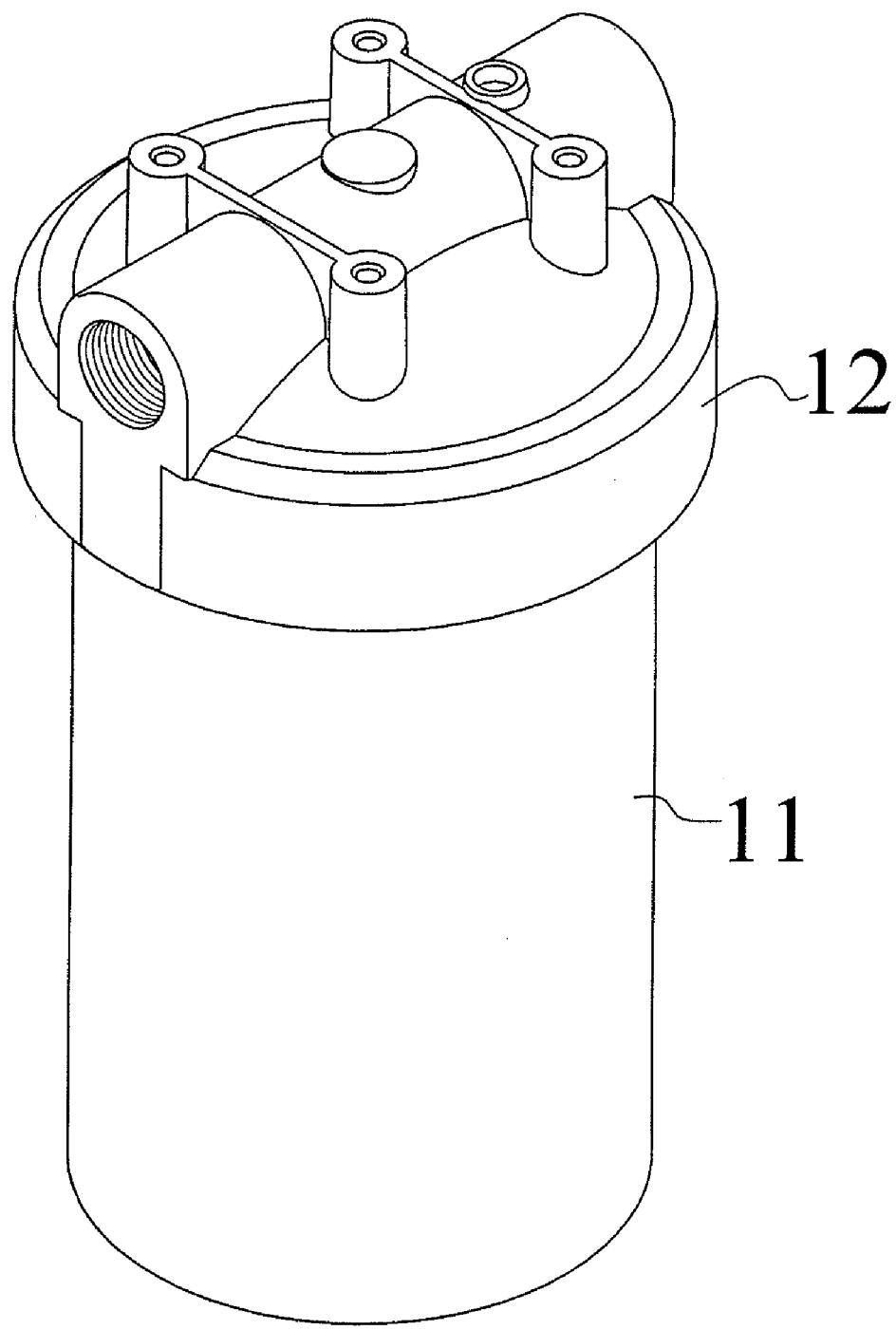
FIG. 1 is a perspective view showing a depressing cap to be cooperated with a water container of water filter.
Figure 2:
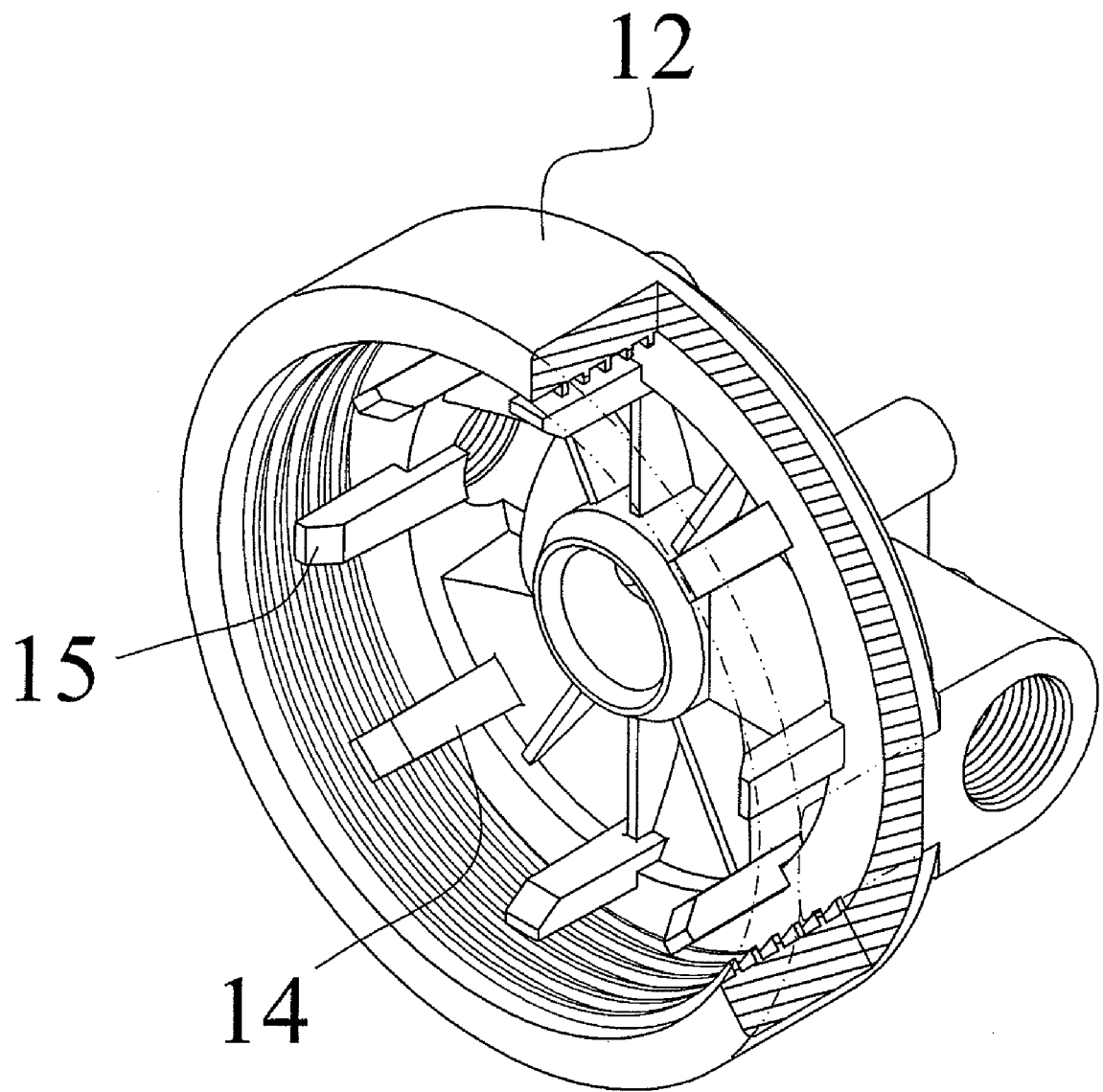
FIG. 2 is a perspective view showing the construction of conventional depressing cap of water filter.
Figure 3:
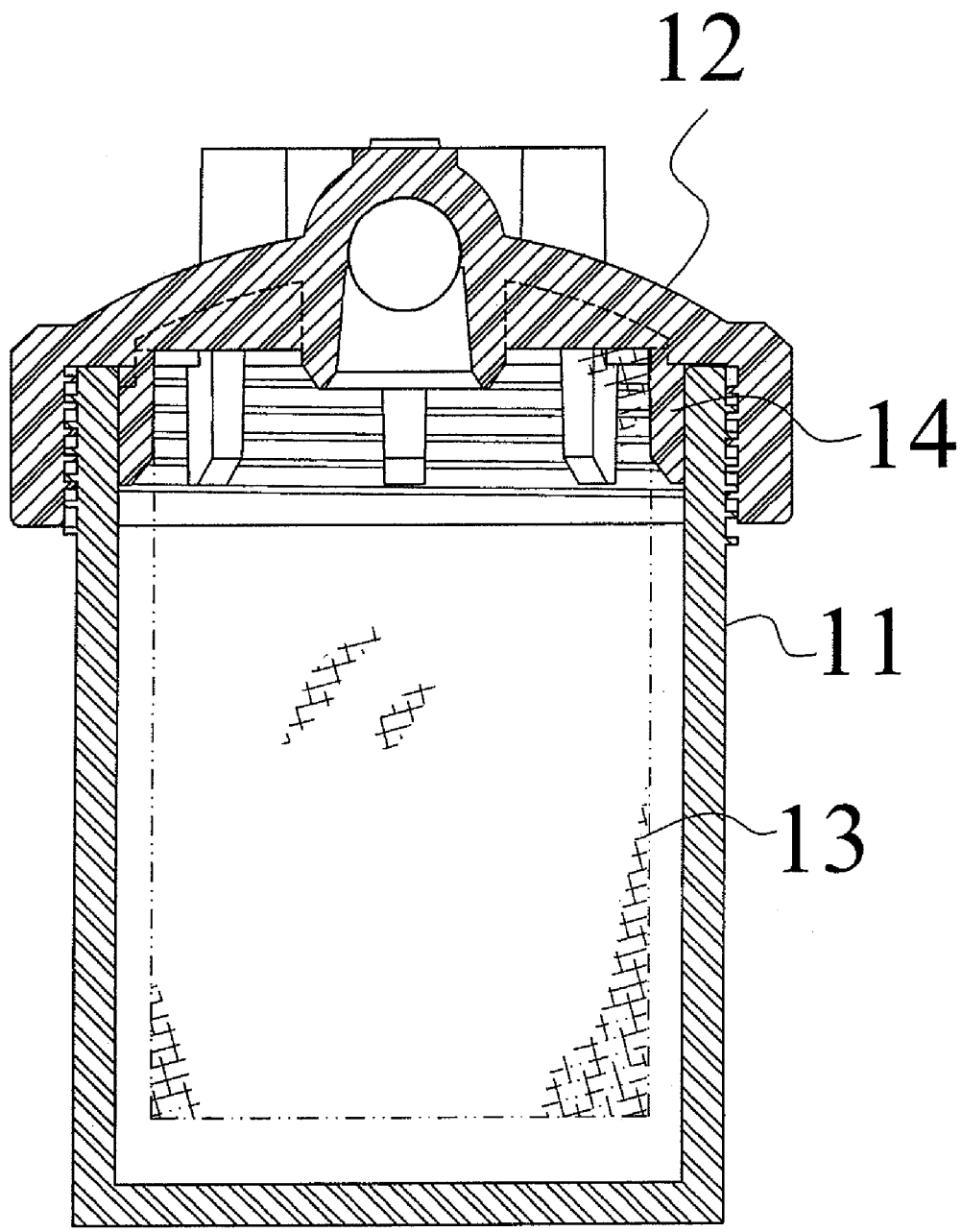
FIG. 3 is a cross-sectional view showing the construction of conventional depressing cap to be cooperated with a water container of water filter.
Figure 4:
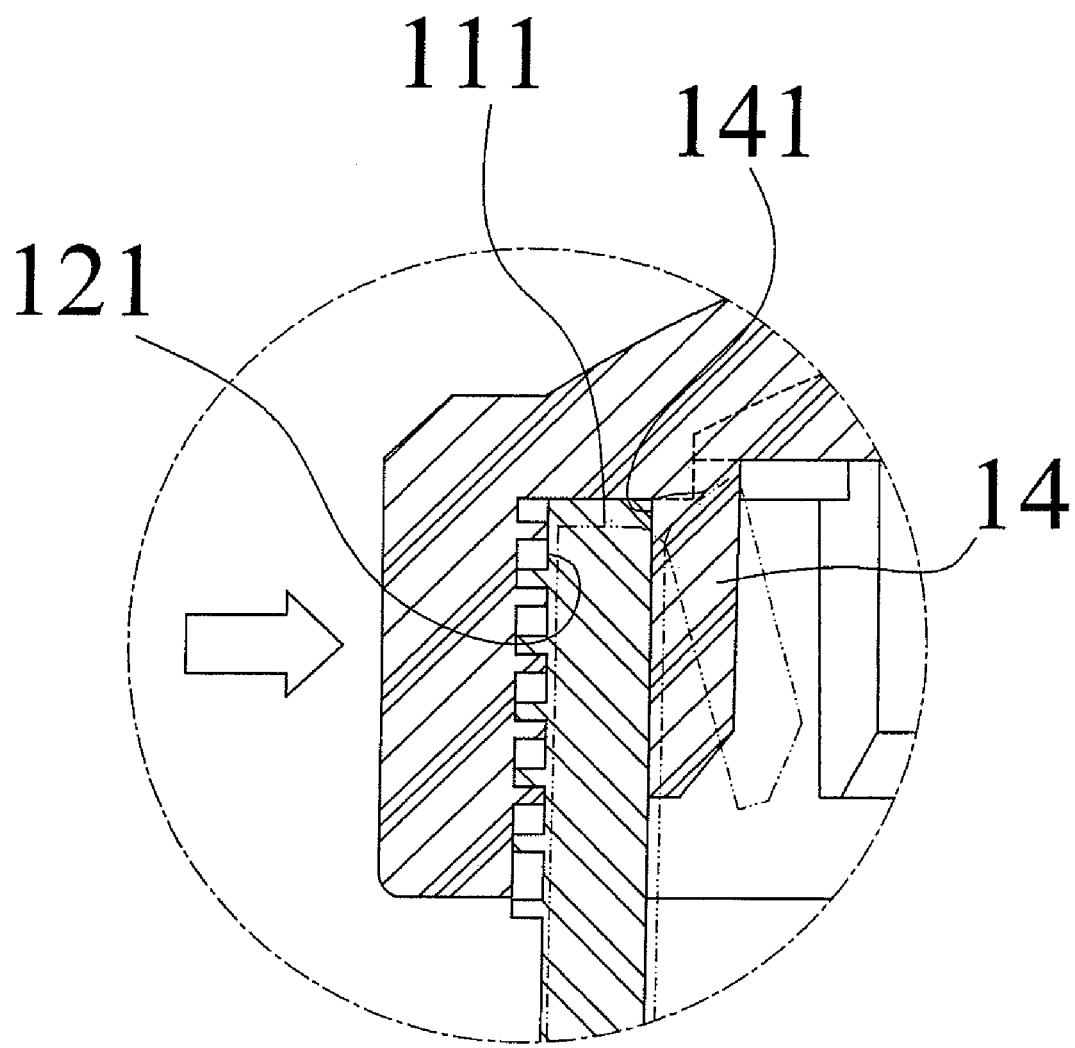
FIG. 4 is a cross-sectional view showing that the conventional gripping element is broken when an external force is acted onto the outside of depressing cap.
Figure 5:
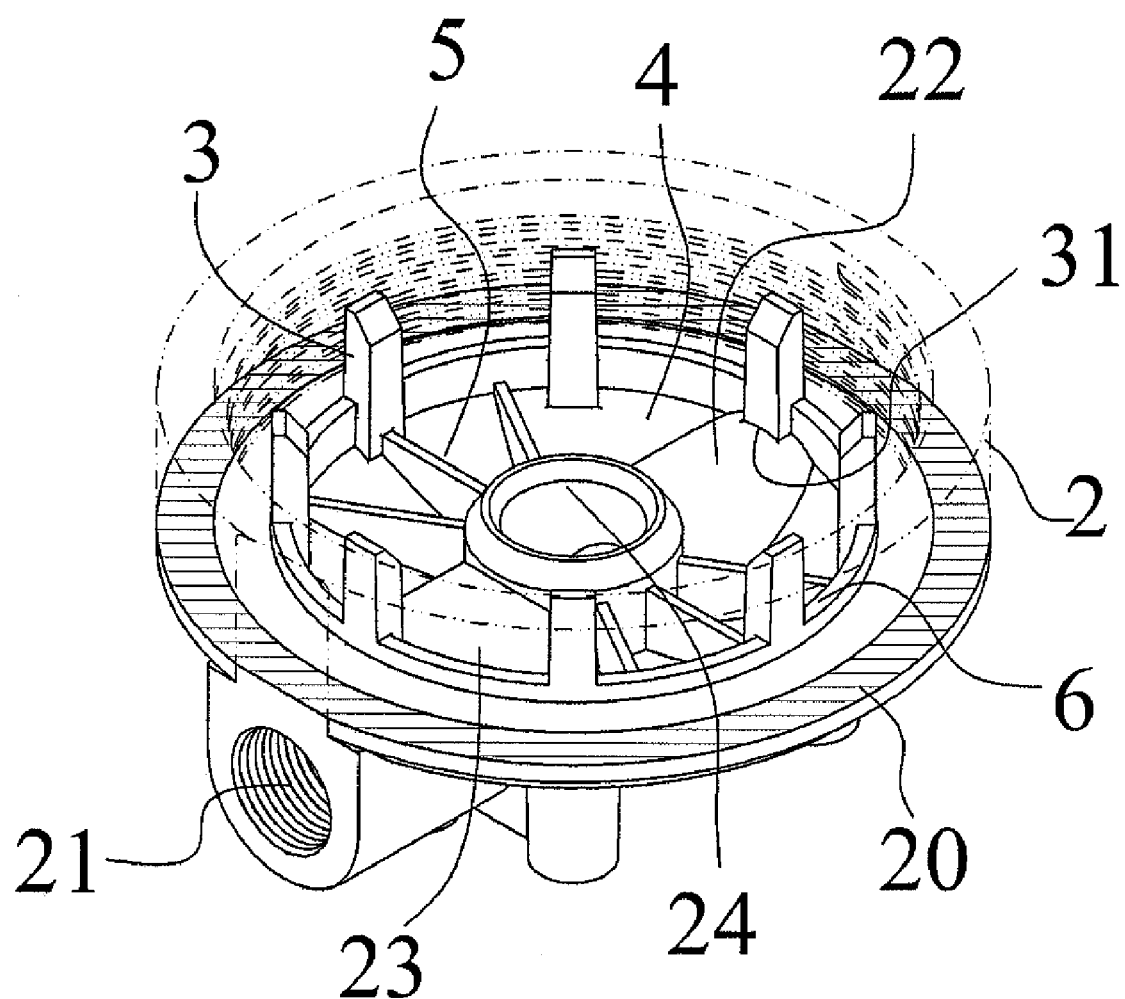
FIG. 5 is a perspective view showing the construction of present invention.
Figure 6:
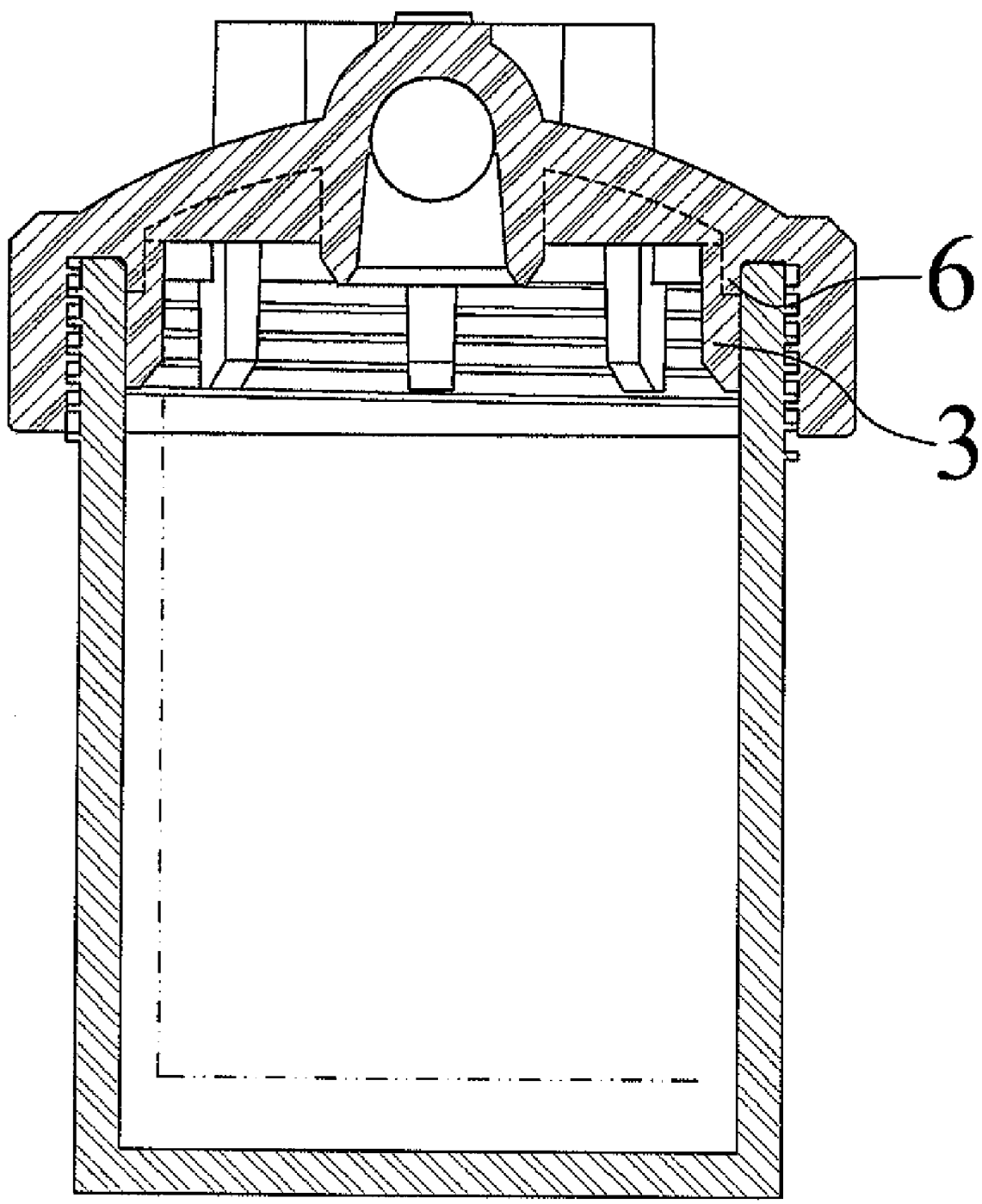
FIG. 6 is a cross-sectional view showing the depressing cap of present invention is cooperated with the water container of water filter.

As shown in FIG. 5, the depressing cap 2 of water filter of present invention also has a water inlet 21 and a water exit (not shown) as conventional ones.

A pipe line 22 which does not form a via hole connecting said water inlet 21 and water exit is formed between said water inlet 21 and water exit, and a water falling hole 23 is formed at the pipe line 22 near the water inlet 21, in addition, a water outlet 24 is formed at the central portion of said pipe line 22, such that water will enter into water container via water inlet 21 and water falling hole 23, then passes the central passage of filter core and flow out of the water pipe from water outlet 24 and water exit for people's uses.

On the inner wall of said depressing cap 2, a plurality of gripping elements 3 for firmly holding filter core are separately formed. The gripping elements are strips in shape and circular arrayed. Furthermore, the bottom of depressing cap 2 where the gripping elements are formed is a concaved circular groove 4, there are a plurality of reinforcing ribs 5 formed in connection with the inner wall and the outer surface of water outlet 24, such that the reinforcing ribs 5 are radially arrayed.

At the base portions of said gripping elements, a ring-shaped protecting wall 6 is formed to connect the base portions of said gripping elements 3. Then a protector which prevents the gripping elements to be broken when an external force is acted at the water filter is formed.

As shown again in FIG. 5, the inner surface of the base portion of said gripping elements 3 is also formed with an arc shaped connecting line, then the strength for enduring external pressure of the gripping elements 3 is increased.

Figure 7:
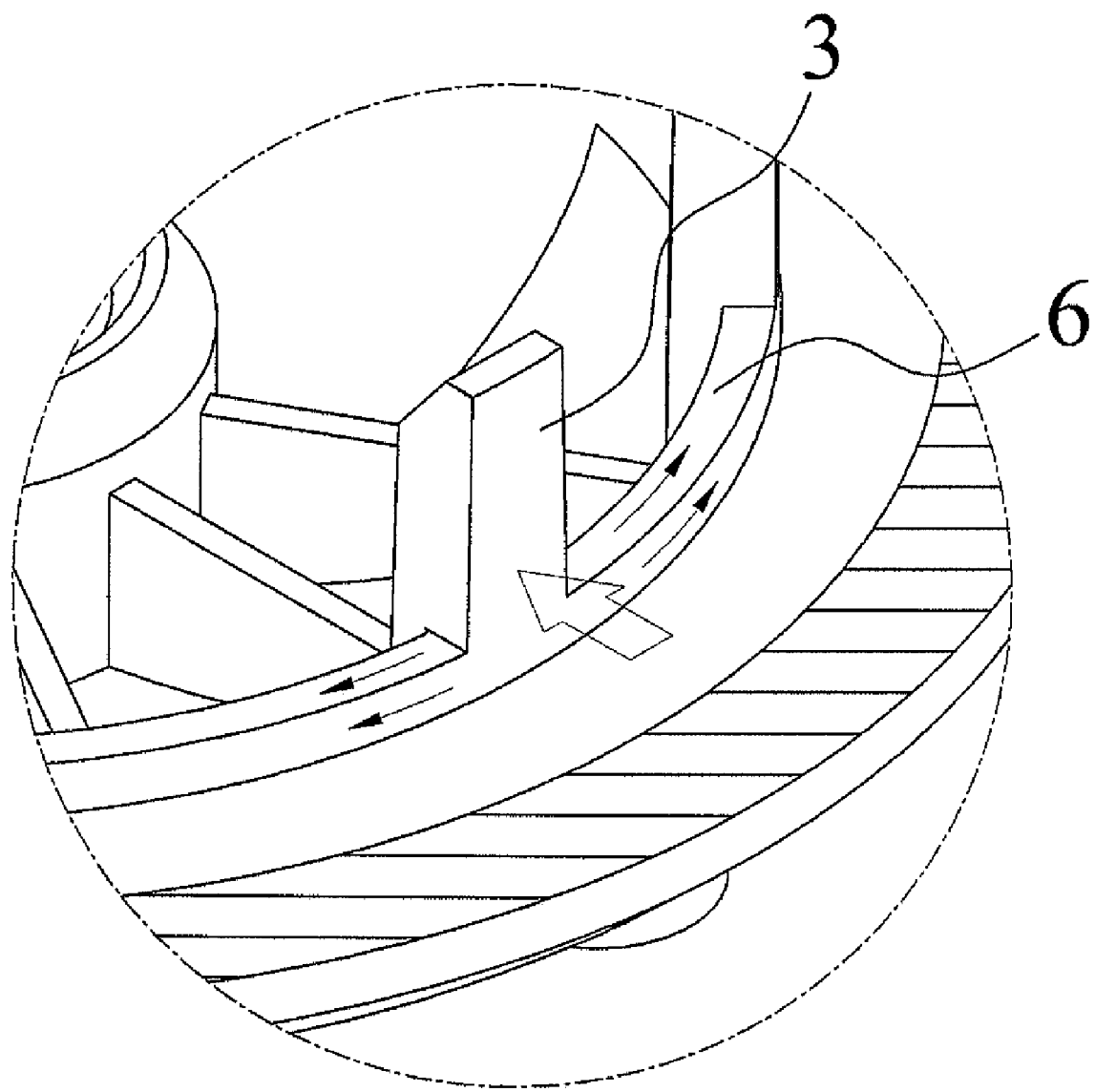
FIG. 7 is a schematic view showing an external force is acted onto the depressing cap.

By the above-mentioned construction, because the base portion of each gripping element 3 is connected each other by ring-shaped protecting wall 6, furthermore, because the depressing cap is formed in one unit by injecting molding, thus the gripping elements not anymore are respectively installed onto the depressing cap. When one or some gripping elements are impacted by external force (as shown by the arrow in FIG. 7) then the external force shall be dissipated to the ring-shaped protecting wall 6, then the force inspecting onto the gripping elements is greatly reduced.

Consequently, according to the depressing cap of present invention, because a section of ring-shaped protecting wall is formed between each of two gripping elements 3 and the ring-shaped protecting wall is formed in one unit with the depressing cap 2 by injecting molding, when a single gripping element of filter core is impacted with external force, the ring-shaped protecting wall and the gripping elements 3 would form into a strengthening construction for depressing cap of water filter. When the water filter is in transportation, or maintenance, or repairing or changing the filter core, and even if the water filter is fallen down onto the ground due to unconsciousness of people, the impact of external forces will be dissipated or eliminated, then the insertion of impact preventing materials is not necessary, the manufacturing cost of water filter is then reduced, the competition in selling water filter is then increased.

In conclusion form above, the strengthening construction for depressing cap of water filter of present invention is actually a new invention which has never seen before, such as any printed matter, or any similar product, it is no doubt has novelty with it. In addition, the unique characteristic and functions of present invention are far beyond that of conventional ones, it is then with progressiveness.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. A strengthening construction for a depressing cap of a water filter, said depressing cap having a water inlet, a water exit and a pipe line which does not include a via hole connecting the water inlet and the water exit and a water falling hole is formed at the pipe line near the water inlet, in addition, a water outlet is formed at a central portion of the pipe line; a ring-shaped protecting wall and a plurality of separately formed and circularly arranged gripping elements for firmly holding a filter core characterized in that: said gripping elements include base portions, and at the base portions of said gripping elements, the ring-shaped protecting wall connecting the base portions of the gripping elements and wherein a plurality of radially arrayed reinforcing ribs extend between the ring-shaped protecting wall and the water outlet for strengthening the construction.

2. The strengthening construction for a depressing cap of a water filter as called for in claim 1, wherein said ring-shaped protecting wall is formed as a unit together with said gripping elements and becomes a part of the depressing cap.

3. The strengthening construction for a depressing cap of a water filter as called for in claim 1, wherein the inner surface of the base portion of said gripping elements is formed with an arc shaped connecting line.

* * * * *